United States Patent [19]
Clugage

[11] 3,791,640
[45] Feb. 12, 1974

[54] COMPRESSION HOLD-DOWN ELEMENTS

[76] Inventor: Robert G. Clugage, 6718 Oak Ave., Felton, Calif. 95018

[22] Filed: July 21, 1972

[21] Appl. No.: 273,971

[52] U.S. Cl. ................................. 269/136, 269/275
[51] Int. Cl. ......... B23q 3/02, B25b 1/24, B25b 5/16
[58] Field of Search ... 269/134, 136, 271, 275, 285; 90/59.63, DIG. 19

[56] References Cited
UNITED STATES PATENTS

| | | | |
|---|---|---|---|
| 2,124,200 | 7/1938 | Lemieux | 269/136 |
| 2,411,059 | 11/1946 | Rubenstein | 269/136 |
| 2,806,411 | 9/1957 | Backman | 269/136 |
| 2,350,099 | 5/1944 | Dermond | 269/248 UX |
| 3,052,461 | 9/1962 | Bateman | 269/275 X |
| 3,371,836 | 3/1968 | Forster et al. | 228/44 X |
| 565,425 | 8/1896 | Bolte et al. | 269/75 |
| 1,124,764 | 1/1915 | Lloyd | 228/44 X |
| 3,140,113 | 7/1964 | Williams | 269/275 X |

FOREIGN PATENTS OR APPLICATIONS

| | | | |
|---|---|---|---|
| 54,958 | 1967 | Germany | 269/136 |

Primary Examiner—Othell M. Simpson
Assistant Examiner—Joseph T. Zatarga
Attorney, Agent, or Firm—Allen and Chromy

[57] ABSTRACT

Workpiece hold-down elements for holding the workpiece between the jaws of a machine vice in such a way that the bottom of the workpiece is firmly pressed against the top of the parallel elements. For this purpose the hold-down elements are of channel shape with the top and bottom portions thereof downwardly sloping. The web connecting these portions is slightly curved so that when the workpiece is clamped between the top portions of opposing hold-down elements and pressure is applied by the vice, the webs of the hold-down elements flex slightly and sufficiently to press the bottom surface of the workpiece firmly against the parallel supports positioned beneath the workpiece.

1 Claim, 3 Drawing Figures

PATENTED FEB 12 1974 3,791,640
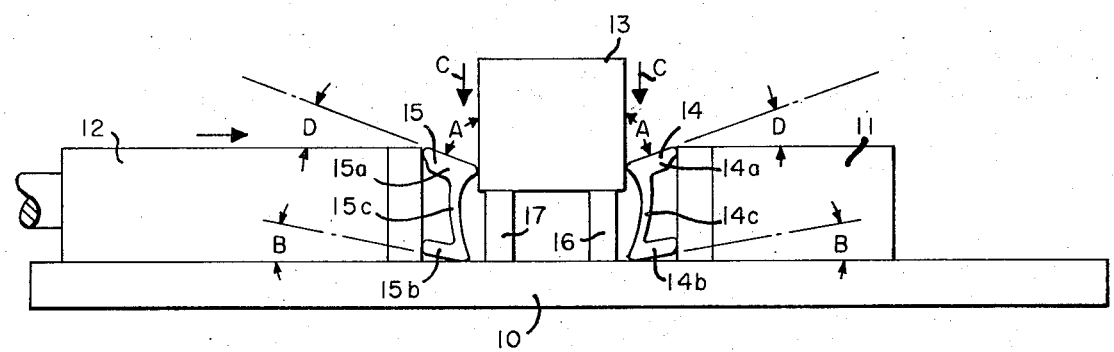
FIG. 1
FIG. 3
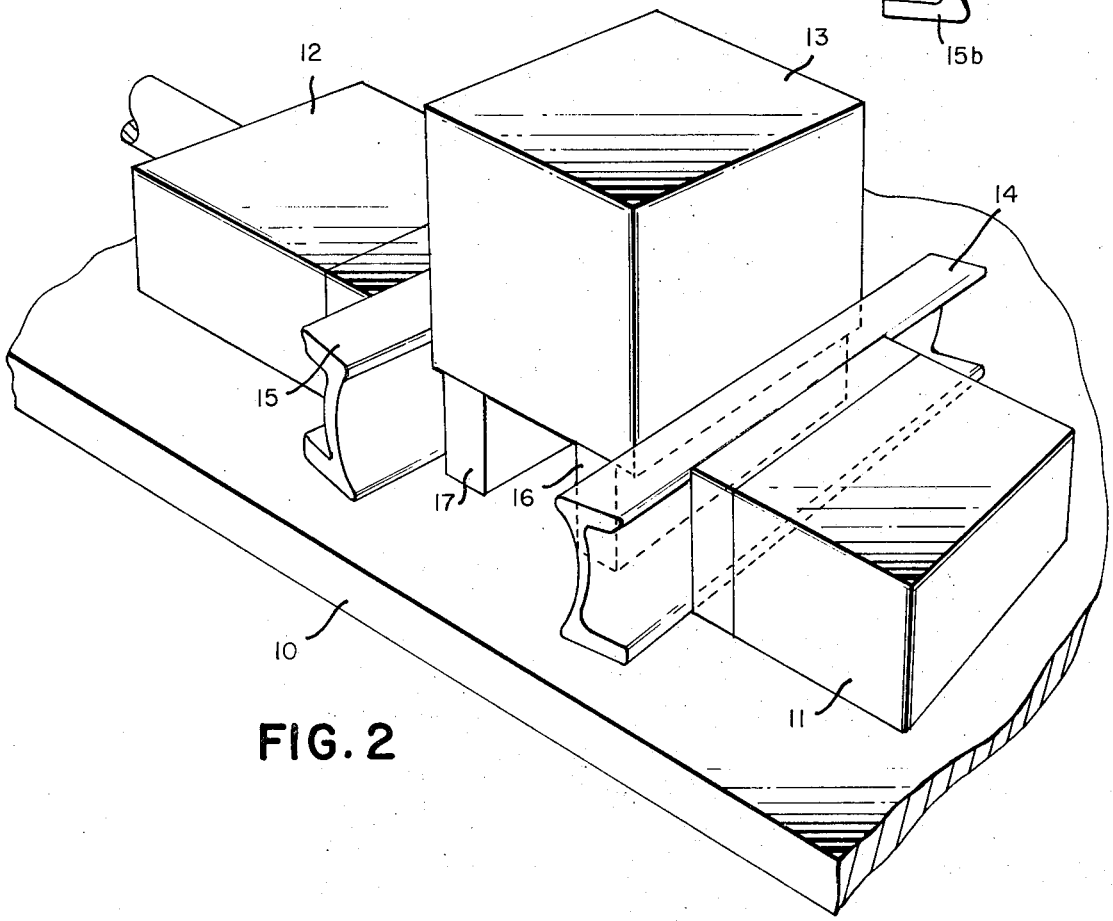
FIG. 2

COMPRESSION HOLD-DOWN ELEMENTS

DESCRIPTION OF THE INVENTION

This invention relates to compression hold-down elements for use with a machine vice to hold the workpiece firmly against the parallel supports.

An object of this invention is to provide improved workpiece hold-down elements that may be efficiently and economically manufactured and that are rugged to withstand use thereof in ordinary machine shops, said elements being of channel shape provided with a web that will flex sufficiently to hold the workpiece firmly pressed against the upper surfaces of parallel supports positioned beneath the workpiece.

Another object of this invention is to provide improved workpiece hold-down elements which are shaped such that a workpiece clamped thereby but the jaws of a vice is not only gripped therebetween so that a mid-portions of the elements flex sufficiently so that a portion of the pressure applied thereto is used to press the workpiece downward against parallel supports.

Other and further objects of this invention will be apparent to those skilled in the art to which it relates from the following specification, claims and drawing.

In accordance with this invention I have provided improved hold-down elements that may be efficiently and economically manufactured and that are sufficiently rugged so that they will withstand the ordinary use in conventional machine shops. The hold-down elements disclosed in this application are of channel shape and the top and bottom parts of the channel are joined by an arcuate web. The top and bottom portions of the channel are also slightly tilted, thus when the hold-down elements are positioned in a vice and pressure is applied thereto so that the top portions of the hold-down elements are pressed against the opposite sides of the workpiece, the webs of the hold-down elements flex. Therefor, a part of the pressure applied to the workpiece is in the direction such that the workpiece is firmly pressed against the parallel supports provided thereunder.

Further details and features of this invention will be set forth in the following specification, claims and drawing in which, briefly:

FIG. 1 is a view in side elevation showing the channel-shaped hold-down elements of this invention positioned between a workpiece and the jaws of a vice;

FIG. 2 is a perspective view showing the hold-down elements of this invention in use; and FIG. 3 is an end view of one of the hold-down elements showing how the web thereof flexes when pressure is applied thereto.

Referring to the drawing in detail, reference numeral 10 designates a flat plate which may be the base of a convention vise or it may be the table of a metal working machine such as a milling machine. Base 10 is provided with a stationary jaw 11 and an adjustable jaw 12 so that the metal workpiece 13 may be held firmly between the jaws 11 and 12. The compression hold-down elements 14 and 15 are provided between the stationary jaw 11 and the movable jaw 12, respectively, and the opposite surfaces of the workpiece 13 as shown in the drawing.

The hold-down element 14 is provided with a top member 14a and a bottom member 14b. These top and bottom members are joined by a slightly curved web 14c. Likewise, the hold-down element 15 is provided with a top member 15a and a bottom member 15b and these members are joined by slightly curved web 15c. The top members 14a and 15a are each inclined or tilted with respect to the sides of the workpiece 13 at an angle which must be less than 90° and is preferably about 70° to 80° designated at A. The top members 14a and 15a are each disposed at an angle D of 10° to 20° with respect to the horizontal plane parallel to the plate 10. The bottom members 14b and 15b are also inclined with respect to the horizontal plane of the plate 10 by a somewhat smaller angle of about 15° designated at B. The sizes of these angles are given by way example only as they are not critical.

The bottom surface of the workpiece 13 is placed on the top surfaces of the parallel supports 16 and 17 and the movable jaw 12 is moved to apply pressure to the hold-down elements 14 and 15 to clamp the workpiece 13 therebetween the top members 14a and 15a of these hold-down elements tend to tilt so as to increase the angle A and as a result pressure is applied to workpiece in the downward direction as indicated by the arrows C. When pressure is applied to the hold-down elements the webs thereof flex as shown in the case of hold-down element 15 in FIG. 3. In this figure the normal contour and shape of the hold-down element is shown in solid lines and the shape thereof when pressure is applied thereto by the vice jaw is shown in broken outline. From this it will be noted that the web 15c of the hold-down element flexes inward because it tends to keep the top part 15a from tilting. Thus the curvature of the web is increased depending of course upon the amount of pressure applied to the top part 15a. As this curvature is increased a part of the pressure applied to the hold-down element is in the direction indicated by the arrow C in FIG. 1. As a result the workpiece is held down firmly against the top surfaces of the parallel supports 16 and 17. The bottom surfaces of which are at the same time, firmly pressed and held against the top of the plate 10.

The hold-down elements 14 and 15 may be made of hard aluminum alloy or stainless steel or rolled tool steel. If the hold-down elements are made of hard aluminum alloy then they may be made by extrusion through suitable dies. The extruded hard aluminum alloy is then heat treated and stretched just beyond its elastic limit to eliminate unevenness in the extrusion process and also to prevent warpage. Thus, a 20 foot extrusion section will be stretched two to 3 inches for this purpose. The surface of the hold-down elements made of aluminum alloy are hard anodized and this may be colored by suitable dies, if desired. In making the hold-down elements from stainless steel the material is aged and then ground to the desired shape, rolled tool steel is aged and hardened and then ground and lapped to the desired shape and finish.

While I have shown and described a preferred form of the invention it will be apparent that the invention is capable of variation and modification from the form shown so that the scope thereof should be limited only by the proper scope of the claims appended hereto.

I claim:

1. An elongated compression hold-down unit for use with jaws of a clamping device for holding a workpiece down upon supporting means interposed between the jaws, the unit comprising an elongated top member having a rounded forward surface for engaging the workpiece, an elongated bottom member, the forward parts of said members being joined by a web, the rear parts of said top member and said bottom member both engaging a jaw of the clamping device, said top member being tilted at a predetermined angle with respect to the side of the workpiece engaged thereby, said predetermined angle is slightly reduced when pressure is applied to said top member and said rear parts of said top member and said bottom member are moved away from each other as said web is flexed whereby the workpiece is pressed down on the supporting means.

* * * * *